(12) United States Patent
Agthe et al.

(10) Patent No.: US 8,208,739 B2
(45) Date of Patent: Jun. 26, 2012

(54) METHODS AND DEVICES FOR THE DETERMINATION AND RECONSTRUCTION OF A PREDICTED IMAGE AREA

(75) Inventors: Bernhard Agthe, München (DE); Gero Bäse, München (DE); Robert Kutka, Geltendorf (DE); Norbert Oertel, Landshut (DE); Jürgen Pandel, Feldkirchen-Westerham (DE)

(73) Assignee: Siemens Aktiengesellshcsft, Munich (DE)

( * ) Notice: Subject to any disclaimer, the term of this patent is extended or adjusted under 35 U.S.C. 154(b) by 1065 days.

(21) Appl. No.: 12/084,101

(22) PCT Filed: Sep. 25, 2006

(86) PCT No.: PCT/EP2006/066683
§ 371 (c)(1),
(2), (4) Date: Apr. 25, 2008

(87) PCT Pub. No.: WO2007/048666
PCT Pub. Date: May 3, 2007

(65) Prior Publication Data
US 2009/0136138 A1       May 28, 2009

(30) Foreign Application Priority Data

Oct. 25, 2005   (DE) .......................... 10 2005 051 091

(51) Int. Cl.
*G06K 9/36*           (2006.01)
(52) U.S. Cl. ......... 382/232; 382/236; 382/238; 382/239
(58) Field of Classification Search .................. 382/232, 382/236, 238, 239
See application file for complete search history.

(56) References Cited

U.S. PATENT DOCUMENTS

2004/0062451 A1* 4/2004 Kita et al. ..................... 382/276
2007/0064806 A1* 3/2007 Paniconi et al. ......... 375/240.16
(Continued)

FOREIGN PATENT DOCUMENTS

CN        1492688 A      4/2004
(Continued)

OTHER PUBLICATIONS

Ndjiki-Nya P. et al., "Improved H.264/AVC Coding using Texture Analysis and Synthesis", Proceedings 2003 International Conference on Image Processing, ICIP-2003, Barcelona, Spain, Sep. 14-17, 2003, International Conference on Image Processing, New York, NY, IEEE, US, vol. 2, pp. 849-852; Ndjiki-Nya P. et al., Improved H.264/AVC Coding using Text.*

(Continued)

*Primary Examiner* — Gregory F Cunningham
(74) *Attorney, Agent, or Firm* — Staas & Halsey LLP (57) ABSTRACT

A method determines a predicted image area for an image area, in which a temporal predictor for the image area is determined based on a reconstructed image that precedes said image, a local predictor for the image area is determined within a reconstructed image area of the image, a margin of error between the image area and the image area predicted image area is determined by the local predictor using the reconstructed image area and by the temporal predictor using one of the preceding images. A predicted image area can be reconstructed. Also disclosed are an establishing device for carrying out the method for determining a predicted image area as well as a reconstructing device for carrying out the reconstruction method.

12 Claims, 4 Drawing Sheets

U.S. PATENT DOCUMENTS

2007/0168370 A1* 7/2007 Hardy .................. 707/101

FOREIGN PATENT DOCUMENTS

| CN | 1585486 A | | 2/2005 |
|---|---|---|---|
| EP | 0644695 A2 | | 3/1995 |
| EP | 1279291 B1 | | 10/2004 |
| EP | 1501312 A2 | * | 1/2005 |
| EP | 1569461 A2 | | 8/2005 |
| EP | 1585059 A2 | | 10/2005 |
| KR | EP 1501312 A2 | * | 1/2005 |
| WO | 2005/022919 | | 3/2005 |

OTHER PUBLICATIONS

Ndjiki-Nya P. et al., "Improved H.264/AVC Coding using Texture Analysis and Synthesis", Proceedings 2003 International Conference on Image Processing, ICIP-2003, Barcelona, Spain, Sep. 14-17, 2003, International Conference on Image Processing, New York, NY, IEEE, US, vol. 2, pp. 849-852; Ndjiki-Nya P. et al., "Improved H.264/AVC Coding using Texture Analysis and Synthesis", Proceedings 2003 International Conference on Image Processing, ICIP-2003, Barcelona, Spain, Sep. 14-17, 2003, International Conference on Image Processing, New York, NY, IEEE, US, vol. 2, pp. 849-852; Ndjiki-Nya P. et al., "Improved H.264/AVC Coding using Texture Analysis and Synthesis", Proceedings 2003 International Conference on Image Processing, ICIP-2003, Barcelona, Spain, Sep. 14-17, 2003, International Conference on Image Processing, New York, NY, IEEE, US, vol. 2, pp. 849-852; Others.

Sugimoto K. et al., "Inter Frame Coding with Template Matching Spatio-Temporal Prediction", Image Processing, 2004. ICIP-2004, International Conference on Singapore Oct. 24-27, 2004. Piscataway. NJ. USA. IEEE vol. 1, Oct. 24, 2004, pp. 465-468; Sugimoto K. et al., "Inter Frame Coding with Template Matching Spatio-Temporal Prediction", Image Processing, 2004, ICIP-2004, International Conference on Singapore Oct. 24-27, 2004, Piscataway, NJ, USA, IEEE vol. 1, Oct. 24, 2004, pp. 465-468; Sugimoto K. et al., "Inter Frame Coding with Template Matching Spatio-Temporal Prediction". Image Processing, 2004, ICIP-2004, International Conference on Singapore Oct. 24-27, 2004, Piscataway, NJ, USA, IEEE vol. 1, Oct. 24, 2004, pp. 465-468; Others.

* cited by examiner

METHODS AND DEVICES FOR THE DETERMINATION AND RECONSTRUCTION OF A PREDICTED IMAGE AREA

CROSS REFERENCE TO RELATED APPLICATIONS

This application is based on and hereby claims priority to German Application No. 10 2005 051 091.4, filed on Oct. 25, 2005 and PCT Application No. PCT/EP2006/066683 filed on Sep. 25, 2006, the contents of which are hereby incorporated by reference.

BACKGROUND OF THE INVENTION

The invention relates to a method and device for determining a predicted image region and a method and device for reconstructing a predicted image region.

The digital transmission of video data with high resolution and refresh rate requires video coding methods with high compression efficiency. A transmission rate, with which a high image quality should be achieved, is hereby often pre-determined for the video coding method.

Video coding methods widely used today are for example standardized as MPEG2, MPEG4, ITU H.261, H.263 and H.264 (MPEG—Motion-Picture Expert Group, ITU—International Telecommunication Union). These video coding methods are based on a hybrid approach, including a temporal prediction of image content (=motion compensation) in conjunction with a transformation, for example a DCT or ICT (DCT—Discrete Cosine Transformation, ICT—Integer Coded Transformation) and a quantization of the error signal remaining after the motion compensation and transformation. With these video coding methods essentially the parameters of the motion model (vectors, block mode) and the resulting coefficients of the residual error signal are transmitted.

An improvement in compression efficiency for the same image quality allows the data transmission rate for transmitting a compressed video sequence to be reduced. This can be achieved for example by improving prediction. Also refinement of a pixel grid from pixel to half-pixel accuracy allows an improvement in motion estimation and therefore motion compensation. A further increase in compression efficiency can be achieved by reducing block sizes, for which a respective prediction is carried out in the context of motion estimation or motion compensation. In addition to an inter-prediction, in other words the utilization of a correlation between images recorded at different times, an intra-prediction can also be used to increase compression efficiency. With this intra-prediction a prediction is carried out for an image region based on already coded and reconstructed image content of the current image.

SUMMARY

One potential object is to create a possibility, which allows an improvement in prediction.

The inventors propose a method for determining a predicted image region for an image region of an image, in which a temporal predictor is determined for the image region based on a reconstructed predecessor image temporally preceding the image, a local predictor is determined for the image region within a reconstructed image region of the image, with a degree of error between the image region and the image region predicted on the basis of the temporal and local predictors being minimized, the predicted image region being determined by the local predictor using the reconstructed image region and by the temporal predictor using one of the predecessor images.

The proposed method reduces a prediction error (=degree of error) based on the image region reconstructed by the local and temporal predictors and the image region to be predicted. This allows an increase in compression efficiency, permitting a reduced storage volume and/or a narrower band transmission link for storing and/or transmitting an image region or image data compressed using the proposed method.

If the predicted image region is generated on the basis of a linking rule by linking a first image region formed by the temporal predictor and a second image region described by the local predictor, it is possible to achieve a further reduction in the prediction error by tailoring the linking rule to the image region to be predicted.

If a weighted link by weighting factors of corresponding pixels of the first and second image regions is described preferably by the linking rule, the linking rule can be implemented in a simple and efficient manner.

The weighting factors for each pixel of the first and/or second image region can also be described individually. This brings about a further improvement in the prediction of the image region to be predicted or a reduction in the prediction error.

Alternatively it is possible to rotate or crop at least the first or second image region preferably based on the linking rule. This allows further refinement of the tailoring of the first and/or second image region, thereby allowing an increase in prediction accuracy.

In a preferred extension of the method the linking rules that minimize the degree of error are selected from a set of different linking rules. This has the advantage that the selected linking rules can be transmitted from a transmitter, e.g. with a device for carrying out the method for determining a predicted image region, to a receiver with a device for carrying out the method for reconstructing a predicted image region with little additional signaling outlay.

If the local predictor references an image region within the already reconstructed image region of the image, the prediction accuracy of the method can be further improved.

To determine the local predictor the intra-prediction mode that minimizes the degree of error is preferably selected from a group of intra-prediction modes. This allows a simple procedure for determining the local predictor. The re-use of intra-prediction modes already known from standards, e.g. H.264, also allows economical implementation.

The inventors also propose a method for reconstructing a predicted image region, wherein the predicted image region is determined by a local and a temporal predictor, which have been formed as described above, with the predicted image region being generated by linking a first image region formed by the temporal predictor and a second image region described by the local predictor.

This provides a method, with which the local and temporal predictors determined in the method for determining a predicted image region of an image can be used for reconstruction. The method for reconstructing a predicted image region can thus be used in the context of a video coding method in a receiver.

The determination device for determining a predicted image region for an image region of an image comprises a first module for determining a temporal predictor for the image region of the image based on a reconstructed predecessor image temporally preceding the image, a second module for determining a local predictor for the image region to be predicted on the basis of a reconstructed image region of the image, with a degree of error between the image region and the image region predicted on the basis of the temporal and local predictors being minimized, the predicted image region being determined by the local predictor using the reconstructed image region and by the temporal predictor using one of the predecessor images. The method for determining a predicted image region for an image region of an image and its extensions can be implemented and executed with the aid of the determination device.

The inventors further propose a reconstruction device for reconstructing a predicted image region, with the predicted image region being determined by a local and a temporal predictor, with the local predictor and temporal predictor being formed on the basis of a determination device to determine a predicted image region, with a first reconstruction module to form a first image region based on the temporal predictor and one of the predecessor images temporally preceding the image, a second reconstruction module to form the second image region based on an image region already reconstructed in the image, a third reconstruction module to reconstruct the predicted image region by linking the first and second image regions. The method for reconstructing a predicted image region and its extensions can be implemented and executed with the aid of the reconstruction device.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Reference will now be made in detail to the preferred embodiments of the present invention, examples of which are illustrated in the accompanying drawings, wherein like reference numerals refer to like elements throughout.

Figure 1:
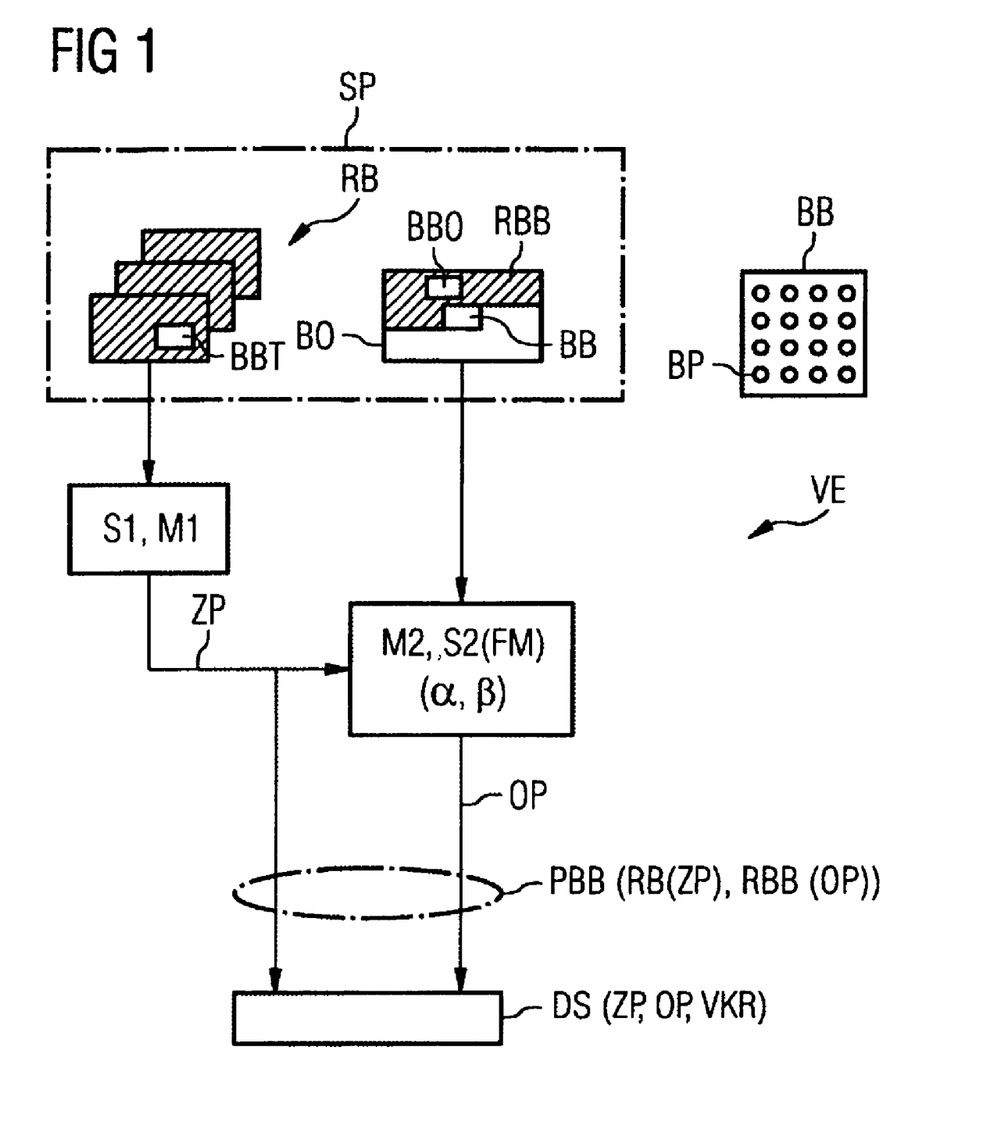
FIG. 1 shows a schematic diagram of the method and device for determining a predicted image region.

The method for determining a predicted image region is first described in more detail with the aid of FIG. 1. An image BO or an image RB temporally preceding the image B0 comprises a number of image regions, which are formed by a plurality of, e.g. 8×8 or 4×4, pixels BP. Each pixel BP hereby represents a brightness value and/or color value. For the exemplary embodiment which follows a square form, e.g. an image block with 4×4 pixels, is assumed for an image region. Generally an image region can have any form.

In a first step S1 a temporal predictor ZP is determined for the image region BB, which is to be predicted. This image region BB is also referred to as the image region to be predicted BB. A first image region BBT is first searched for in one of the images RB temporally preceding the image B0, which for example minimizes a sum of the absolute differences between corresponding pixels BB in the image region to be predicted BB and in the first image region BBT.

If the respective image regions BB and BBT respectively comprise for example 4×4 pixels, this first step can be written formally as follows:

$$SAD = \sum_{x=0}^{3} \sum_{y=0}^{3} |BB(x, y) - BBT(x, y)| \quad (1)$$

where x,y are positions of pixels BP within the respective image regions BB, BBT and |.| is an absolute sum. In equation (1) the first image region BBT in the image RB temporally preceding the image B0 that minimizes this equation (1), in other words SAD becomes minimal, is determined. The location of the determined first image region BBT is represented by the temporal predictor ZP. The first image region BBT can be formed both on the basis of predetermined pixels of the image RB and by interpolation of the pixels of the image RB, for example on intermediate pixels (halfpel). The person skilled in the art has been familiar with such methods for some time from motion estimation, e.g. of standard H.263.

In a second step S2 a local predictor OP is determined, which minimizes a degree of error FM between the image region to be predicted BB and the image region PBB predicted on the basis of the temporal and local predictors ZP, OP. The degree of error FM corresponds to a prediction error. The local predictor OP uses a reconstructed image region RBB within the image BO, which has already been reconstructed.

In a first variant of the proposed method, to determine the local predictor OP, a second image region BBO is determined in the already reconstructed image region RBB, which together with the first image region BBT determined by the temporal predictor ZP minimizes the degree of error FM. In this process the first and second image regions BBT, BBO are linked or mixed by a linking rule VKR. In the present exemplary embodiment the linking rule VKR describes a weighted pixel by pixel mixing of the first and second image regions BBT, BBO by assigned weighting factors. This can be shown formally as follows:

$$FM = \sum_{x=0}^{3} \sum_{y=0}^{3} \left| BB(x, y) - \left( \frac{\alpha \cdot BBT(x, y) + \beta \cdot BBO(x, y)}{\alpha + \beta} \right) \right| \quad (2)$$

where x,y are positions of pixels BP within the respective image regions BB, BBT, BBO, |.| is the absolute sum, α is a temporal and β a local weighting factor. α+β=1 can result here. In equation (2) the second image region BBO in the already reconstructed image region RBB is determined, which minimizes this equation (2), i.e. FM becomes minimal. The location of the determined second image region BBO is represented by the local predictor OP. The weighting factors α and β can be tailored according to the respective image content, e.g. for α=0.2 and β=0.8 a larger weighting is assigned to the second image region BBO than to the first image region BBT, i.e. to the local than to the temporal predictor.

In equation (2) the term {(α·BBT(x, y)+β·BBO(x, y))/(α+β)} corresponds to the predicted image region PBB. Thus the predicted image region PBB is represented by the temporal predictor ZP, which describes the first image region BBT based on the image RB temporally preceding the image B0, i.e. RB(ZP), and the local predictor OP, which reproduces the second image region BBO using the reconstructed image region RPP of the image BO, i.e. RBB(OP).

Other functions can replace the absolute sum in equation (1) and (2), describing a similarity between the image region to be predicted BO and the predicted image region PBB. The degree of error FM could therefore also be generated by squaring instead of by the absolute sum, for example:

$$FM = \sum_{x=0}^{3}\sum_{y=0}^{3}\left(BB(x,y) - \left(\frac{\alpha \cdot BBT(x,y) + \beta \cdot BBO(x,y)}{\alpha + \beta}\right)\right)^2 \quad (3)$$

Steps S1 and S2 can be used in the context of a method for coding one or a number of images. The local and temporal predictors OP, ZP can hereby be integrated in a data stream DS and be transmitted from a determination device VE for determining a predicted image region to a reconstruction device VD for reconstructing the predicted image region.

The weighted linking or mixing according to equation (2) only represents one of the possible linking rules VKR. The linking rule VKR can thus be formed as a function of the determined temporal and/or local predictors ZP, OP. It is also possible to select a linking rule VKR from a predetermined set of linking rules in such a manner that the selected linking rule minimizes the degree of error FM. One example of a selection option is:

| VKR index | $\alpha$ | $\beta$ |
|---|---|---|
| 0 | 0.2 | 0.8 |
| 1 | 0.5 | 0.5 |
| 2 | 0.8 | 0.2 |

The VKR index describes the linking rule used. The selected linking rule can be generated separately in the determination device VE and the reconstruction device VD. Alternatively this linking rule VKR can be transmitted by the data stream DS.

Figure 2:
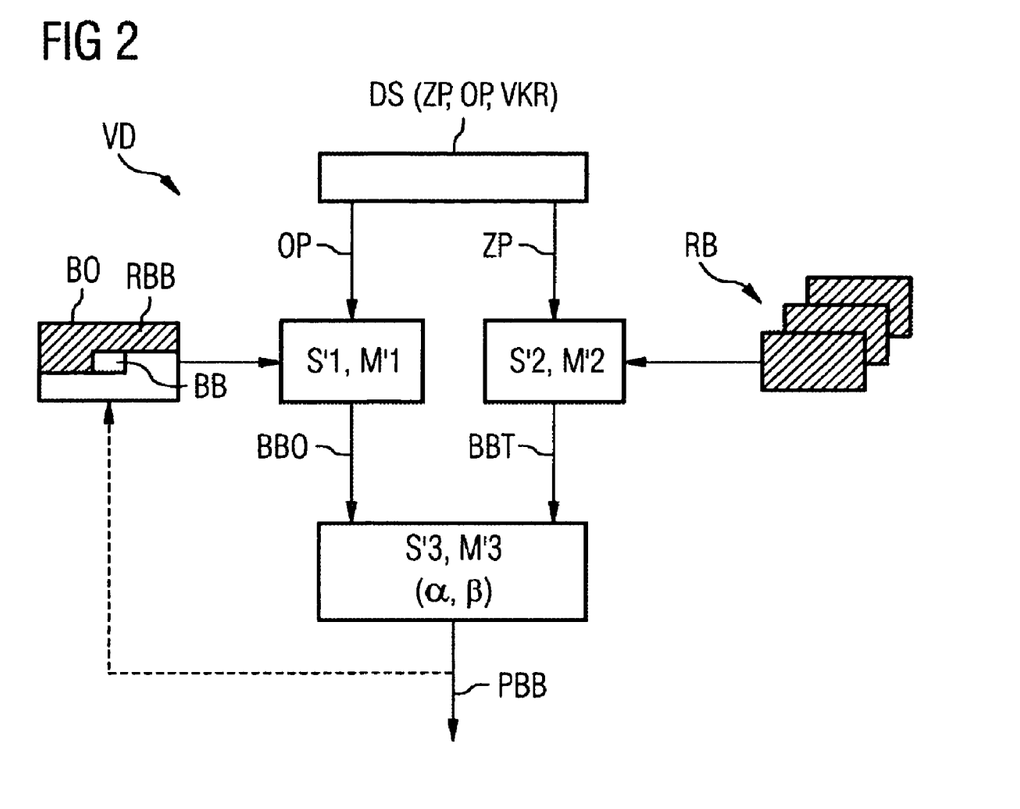
FIG. 2 shows a schematic diagram of the device and method for reconstructing a predicted image region.

The reconstruction of the predicted image region PBB is described in more detail with reference to FIG. 2, with the temporal and local predictors ZP, OP having been created according to the method for determining a predicted image region. The device VD for reconstruction receives the data stream DS for example, which includes the local and temporal predictors OP, ZP.

In a first reconstruction step S'1 the second image region BBO is obtained by using the local predictor OP based on the already reconstructed image region RBB of the image BO.

In a second reconstruction step S'2 the first image region is generated based on the temporal predictor ZP using the image RB temporally preceding the image B0.

In a subsequent third reconstruction step S'3 the predicted image region PBB is determined by mixing the first and second image regions BBT, BBO. The mix can be generated by a pixel by pixel (x,y) weighted averaging of the first and second image regions. This can be represented by the following equation:

$$PBB(x,y) = \frac{\alpha \cdot BBT(x,y) + \beta \cdot BBO(x,y)}{\alpha + \beta}, \quad (4)$$

where x,y are positions of pixels BP within the respective image regions BBT, BBO, $\alpha$ is the temporal and $\beta$ the local weighting factors. The values of the weighting factors used here are identical in the determination method and the reconstruction method.

The predicted and thus reconstructed image region PBB can finally be copied to the corresponding position within the reconstructed image region RBB.

In a second variant of the method, to determine the local predictor OP, an intra-prediction mode IPM is determined, which minimizes the degree of error FM. In this process the intra-prediction mode IPM is determined based on the reconstructed image region RBB of the image BO, with for example edge pixels of directly adjacent reconstructed image regions of the image region to be predicted BB being taken into account. This is described in more detail with reference to FIG. 4.

Figure 4:
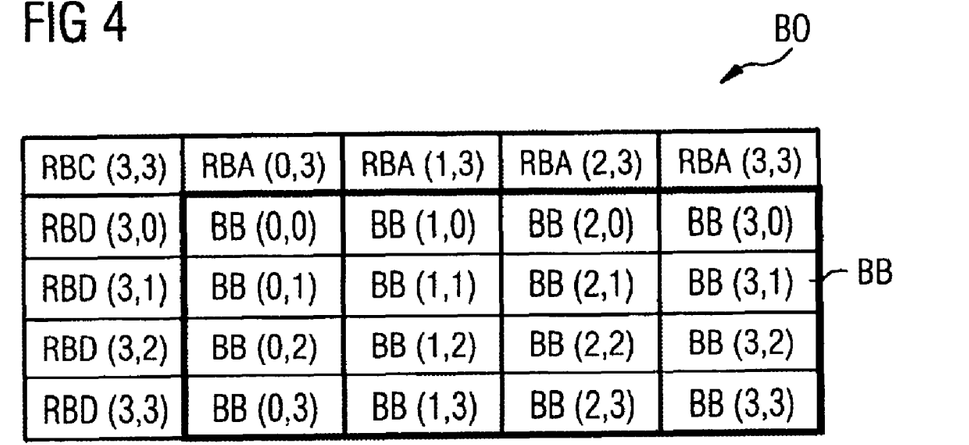
FIG. 4 shows an arrangement of adjacent edge pixels of an image region or image block to be predicted.

FIG. 4 shows the region to be predicted BB, with the individual pixels indicated, for example BB(0,0). If image regions are reconstructed for example from left to right and from top to bottom, the reconstructed image region RBB, as shown in FIG. 1 for example, results. Associated with this reconstructed image region are the already reconstructed image regions RBA, RBC and RBD, located at the top, top left and left of the image region to be predicted BB. Individual pixels, for example RBA(3,3), are indicated, these pixels being directly adjacent to the image region to be predicted BB.

To determine the local predictor OP, one of the intra-prediction modes IPM is determined, which minimizes the degree of error FM. Such intra-prediction modes IPM are known to the person skilled in the art, for example from the video coding standard H.264. In this eight different intra-prediction modes are used, which differ respectively in prediction direction in addition to the direct component prediction mode. Thus for example the following intra-prediction modes are known according to H.264:

| Mode number | Designation |
|---|---|
| 0 | Vertical prediction mode |
| 1 | Horizontal prediction mode |
| 2 | Direct component - prediction mode |
| 3 | Diagonal-downward-left prediction mode |
| 4 | Diagonal-downward-right prediction mode |
| 5 | Vertical-right prediction mode |
| 6 | Horizontal-downward prediction mode |
| 7 | Vertical-left prediction mode |
| 8 | Horizontal-upward prediction mode |

It is thus possible, by indicating the mode number of the intra-prediction mode, to indicate one of the instructions for forming the associated intra-prediction mode. If the mode number 2 is used for example, an identical prediction value results for all pixels of the second image region BBO. This is:

$$BBO(x,y) = \frac{\sum_{i=0}^{3} RBA(i,3) + \sum_{i=0}^{3} RBD(3,i) + 4}{8} \quad (5)$$

where i identifies the corresponding pixel. The prediction value resulting from equation 5 is allocated to all pixels of the second image region BBO.

To determine an optimal intra-prediction mode IPM two image regions BBO are calculated for example for all intra-prediction modes IPM and these are fed respectively into the equation (3). The intra-prediction mode IPM is then selected, which minimizes the degree of error FM. The determined intra-prediction mode IPM is represented by the local predictor OP. If the intra-prediction mode with mode number 5 for example minimizes the degree of error, then OP=5.

In equation (3) a weighted averaging of the respective pixels of the first and second image regions BBT, BBO has been carried out in such a manner that each pixel of the first image region is multiplied by the temporal weighting factor α and each pixel of the second image region has been multiplied by the local weighting factor β. In one extension of the method each pixel is provided with an individual temporal and/or local weighting factor α(x,y), β(x,y). Such individual temporal and/or local weighting factors can be as follows for example:

$$\alpha(x, y) = \begin{bmatrix} 0.2 & 0.2 & 0.2 & 0.2 \\ 0.2 & 0.5 & 0.5 & 0.5 \\ 0.2 & 0.5 & 0.8 & 0.8 \\ 0.2 & 0.5 & 0.8 & 1.0 \end{bmatrix}, \beta(x, y) = \begin{bmatrix} 0.8 & 0.8 & 0.8 & 0.8 \\ 0.8 & 0.5 & 0.5 & 0.5 \\ 0.8 & 0.5 & 0.2 & 0.2 \\ 0.8 & 0.5 & 0.2 & 0.0 \end{bmatrix}$$

The use of such individual temporal and local weighting factors α(x, y), β(x, y) means that at the top left edge of the image region to be predicted the local prediction has a greater influence on the weighted overlaying than at the bottom right edge.

When using identical temporal and/or local weighting factors for each pixel, the equations (2) and (4) are extended as follows:

$$FM = \sum_{x=0}^{3}\sum_{y=0}^{3}\left|BB(x, y) - \left(\frac{\alpha(x, y) \cdot BBT(x, y) + \beta(x, y) \cdot BBO(x, y)}{\alpha(x, y) + \beta(x, y)}\right)\right| \quad (6)$$

$$PBB(x, y) = \frac{\alpha(x, y) \cdot BBT(x, y) + \beta(x, y) \cdot BBO(x, y)}{\alpha(x, y) + \beta(x, y)}, \quad (7)$$

Individual local and/or temporal weighting factors α(x,y), β(x,y) can also be selected in a different manner as a function of the selected intra-prediction mode IPM respectively.

Figure 3:
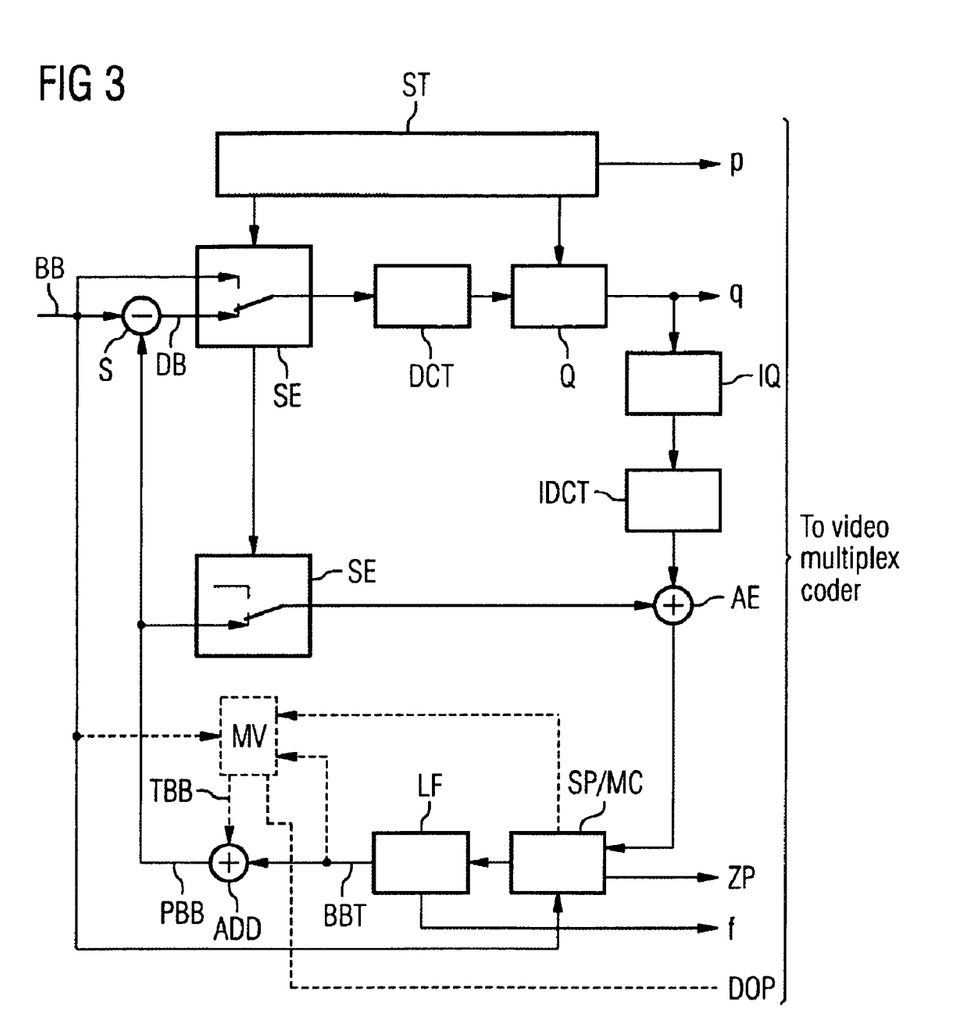
FIG. 3 shows an outline of a standard arrangement for block-based image coding with an extension for implementing the method for determining a predicted image region.

The method for determining a predicted image region and the method for reconstructing a predicted image region can be used in an image coding method. This is described based on an example with reference to FIG. 3. FIG. 3 shows a detailed illustration of a possible arrangement in the form of a basic circuit diagram for image coding and/or image decoding, which can be used in the context of block-based image coding. Use of the method in a video coding method is hereby shown in more detail, with extensions for integrating the determination and/or reconstruction method shown with a broken line.

In the case of block-based image coding methods, a digitized image BO, RB, is divided into generally square image regions BB of size 8×8 pixels BP or 16×16 pixels BP and fed to the arrangement for image coding.

Coding information is generally assigned uniquely to a pixel, for example brightness information (luminance values) or color information (chrominance values).

With the block-based image coding methods a distinction is made between different image coding modes. With the so-called intra-image-coding mode the whole image is respectively coded with all the coding information assigned to the pixels of the image and transmitted (I image). With the so-called inter-image-coding mode only the differential image information of two temporally successive images is respectively coded and transmitted (P image, B image).

Two switch units SE are provided to switch between intra-image-coding mode and inter-image-coding mode. To implement inter-image-coding mode a subtraction unit S is provided, in which the difference between the image information of two successive images is formed. All image coding is controlled by way of an image coding control unit ST. The image regions BB and/or differential image regions DB to be coded are fed respectively to a transformation coding unit DCT, in which a transformation coding, for example the discrete cosine transformation (DCT), is applied to the coding information assigned to the pixels.

Generally however any transformation coding, for example a discrete sine transformation or even a discrete Fourier transformation, can be carried out.

The spectral coefficients formed by the transformation coding are quantized in a quantization unit Q and fed to an image coding multiplexer (not shown) for example for channel coding and/or entropy coding. In an internal reconstruction loop the quantized spectral coefficients are quantized inversely in an inverse quantization unit IQ and subjected to inverse transformation coding in an inverse transformation coding unit IDCT.

In the case of inter-image-coding image information of the respective temporally preceding image is also added in an adding unit AE. The images thus reconstructed are stored in an image store SP. A unit for motion estimation/motion compensation MC is shown symbolically in the image store SP to simplify the illustration. This unit for motion compensation MC generates a motion vector, i.e. the temporal predictor ZP.

A loop filter LF is also provided, being connected to the store SP and the subtraction unit S.

A mode flag p is also fed to the image coding multiplexer in addition to the image data to be transmitted. This mode flag p indicates respectively whether intra and/or inter-image-coding has been carried out.

Quantization indices q for the spectral coefficients are also fed to the image coding multiplexer.

The temporal predictor ZP, i.e. a motion vector, is assigned respectively to an image region or image block and/or a macroblock, which has four example four image blocks with brightness information and two image blocks with color information, and is fed to the image coding multiplexer.

An information indicator f is also provided to activate or deactivate the loop filter LF.

A module MV has access to the image region to be predicted BB, the first image region BBT and the reconstructed image region RBB. The first image region BBT is generated using the motion estimation MC and after applying the loop filter LF. The module MV first determines the local predictor OP, which minimizes the degree of error, e.g. according to equation (3).

The module MV then generates a temporary image region TBB, which satisfies the following equation:

$$PBB(x,y)=BBT(x,y)+TBB(x,y) \quad (8)$$

With the aid of this temporary image region TBB, after addition of this temporary image region TBB to the first image region BBT in the additional adding unit ADD, the predicted image region PBB results and can be further processed. When the equation (4) is used, TBB(x,y) is obtained as follows:

$$TBB(x, y) = \frac{\beta}{\alpha + \beta} \cdot (BBO(x, y) - BBT(x, y)) \qquad (9)$$

The method for determining the predicted image region PBB can be implemented by the determination device VE. This determination device comprises the following units:
- a first module M1 to determine the temporal predictor ZP for the image region to be predicted BB of the image B0 based on a reconstructed predecessor image RB temporally preceding the image B0;
- a second module M2 to determine the local predictor OP for the image region to be predicted BB based on a reconstructed image region RBB of the image BO, with the degree of error FM between the image region to be predicted BB and the image region PBB predicted on the basis of the temporal and local predictors ZP, OP being minimized, with the predicted image region PBB being determined by the local predictor OP using the reconstructed image region RBB and by the temporal predictor Z) using one of the predecessor images RB.

This determination device VE can be integrated in a device which executes a video coding method.

The method for reconstructing the predicted image region RBB can be implemented by the reconstruction device DV. This reconstruction device DV hereby comprises the following reconstruction modules:
- a first reconstruction module M'1 to form the first image region BBT based on the temporal predictor ZP and one of the predecessor images RB temporally preceding the image BO;
- a second reconstruction module M'2 to form the second image region BBO based on the image region RBBM already reconstructed in the image BO
- a third reconstruction module M'3 to reconstruct the predicted image region by linking the first and second image regions BBT, BBO taking into account the linking rule VKR.

This reconstruction device VD can be integrated in a device which executes a video coding method.

The determination device VE and the reconstruction device VD can be integrated in a mobile radio device, for example operating according to the GSM standard (GSM—Global System for Mobile Communications), or in a fixed network device, for example a computer, which is connected to a LAN (LAN—Local Area Network). The devices VD, VE can also be implemented and executed in hardware, as executable software on a processor, or as a combination of software and hardware.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV*, 69 USPQ2d 1865 (Fed. Cir. 2004).

The invention claimed is:

1. A method for determining a predicted first image region used for prediction of a to be predicted second image region of a current image, comprising:
    determining a temporal predictor for the second image region based on a reconstructed predecessor image temporally preceding the current image, whereby the temporal predictor points to a third image region in the reconstructed predecessor image;
    determining a local predictor for the second image region within a reconstructed image region of the current image, whereby the local predictor points to a fourth image region within the reconstructed image region of the current image, with a minimal degree of error determined between the second image region and a predicted first image region on basis of the third image region of the temporal predictor and the fourth image region of the local predictor; and
    determining the predicted first image region by the fourth image region of the determined local predictor that uses the reconstructed image region of the current image and by the third image region of the determined temporal predictor that uses the reconstructed predecessor image.

2. The method as claimed in claim 1, wherein the predicted first image region is generated by linking the third image region formed by the temporal predictor and the fourth image region described by the local predictor based on a linking rule.

3. The method as claimed in claim 2, wherein the linking rule describes a weighted linking by weighting factors of corresponding pixels of the third and fourth image regions.

4. The method as claimed in claim 3, wherein the weighting factors for each pixel of the third and/or fourth image region are described individually.

5. The method as claimed in claim 4, wherein rotation or cropping of at least the third or fourth image region is carried out based on the linking rule.

6. The method as claimed in claim 4, wherein
    the linking rule minimizes the degree of error, and
    the linking rule is selected from a set of different linking rules.

7. The method as claimed in claim 1, wherein the reconstructed image region of the current image is referenced by the local predictor.

8. The method as claimed in claim 1, wherein to determine the local predictor from a group of predeterminable intra-prediction modes, a intra-prediction mode that minimizes the degree of error is selected.

9. A method for reconstructing a predicted first image region, wherein the predicted first image region is determined by a local predictor and a temporal predictor, which were formed based on a method for determining the predicted first image region as claimed in claim 1, with the predicted first image region being generated by linking the third image region formed by the temporal predictor and the fourth image region described by the local predictor.

10. A determination device for determining a predicted first image region used for prediction of a to be predicted second image region of a current image, comprising:
    a first module to determine a temporal predictor for the second image region based on a reconstructed predecessor image temporally preceding the current image, whereby the temporal predictor points to a third image region in the reconstructed predecessor image;
    a second module to determine a local predictor for the second image region within a reconstructed image region of the current image, whereby the local predictor points to a fourth image region within the reconstructed image region of the current image, with a minimal degree of error determined between the second image region and a predicted first image region on basis of the third image region of the temporal predictor and the fourth image region of the local predictor; and
    a third module to determine the predicted first image region by the fourth image region of the determined local predictor that uses the reconstructed image region of the current image and by the third image region of the determined temporal predictor that uses the reconstructed predecessor image.

11. A reconstruction device for reconstructing a predicted first image region, with the predicted first image region being determined by a local and a temporal predictor, with the local predictor and the temporal predictor having been formed on basis of the determination device for determining the predicted first image region as claimed in claim 10, comprising:
- a first reconstruction module to form the third image region based on the temporal predictor and one of the predecessor images temporally preceding the current image;
- a second reconstruction module to form the fourth image region based on an image region already reconstructed in the current image; and
- a third reconstruction module to reconstruct the predicted first image region by linking the third and fourth image regions.

12. A method for generating a to be predicted second image region of a current image, comprising:
- determining a temporal predictor for the second image region based on a third image region of a reconstructed predecessor image temporally preceding the current image, the temporal predictor relating to a location of the third image region within the reconstructed predecessor image, the location of the third image region being selected to minimize distortion between subject matter of the third image region and subject matter of the second image region;
- determining a local predictor for the second image region based on a fourth image region from a reconstructed portion of the current image, the local predictor relating to a location of the fourth image region within the reconstructed portion of the current image, the location of the fourth image region being selected to minimize distortion between subject matter of the fourth image region and subject matter of the second image region;
- determining a predicted first image region used for prediction of the second image region based upon the third and fourth image regions; and
- generating the second image region based on the predicted first image region.

* * * * *